Sept. 1, 1959 J. M. McCORMICK 2,901,865
MEANS FOR COOLING GLASS FORMING MOLDS
Filed Aug. 10, 1955 2 Sheets-Sheet 1

INVENTOR.
JOHN M. McCORMICK
BY
Rule and Hoge
ATTORNEYS

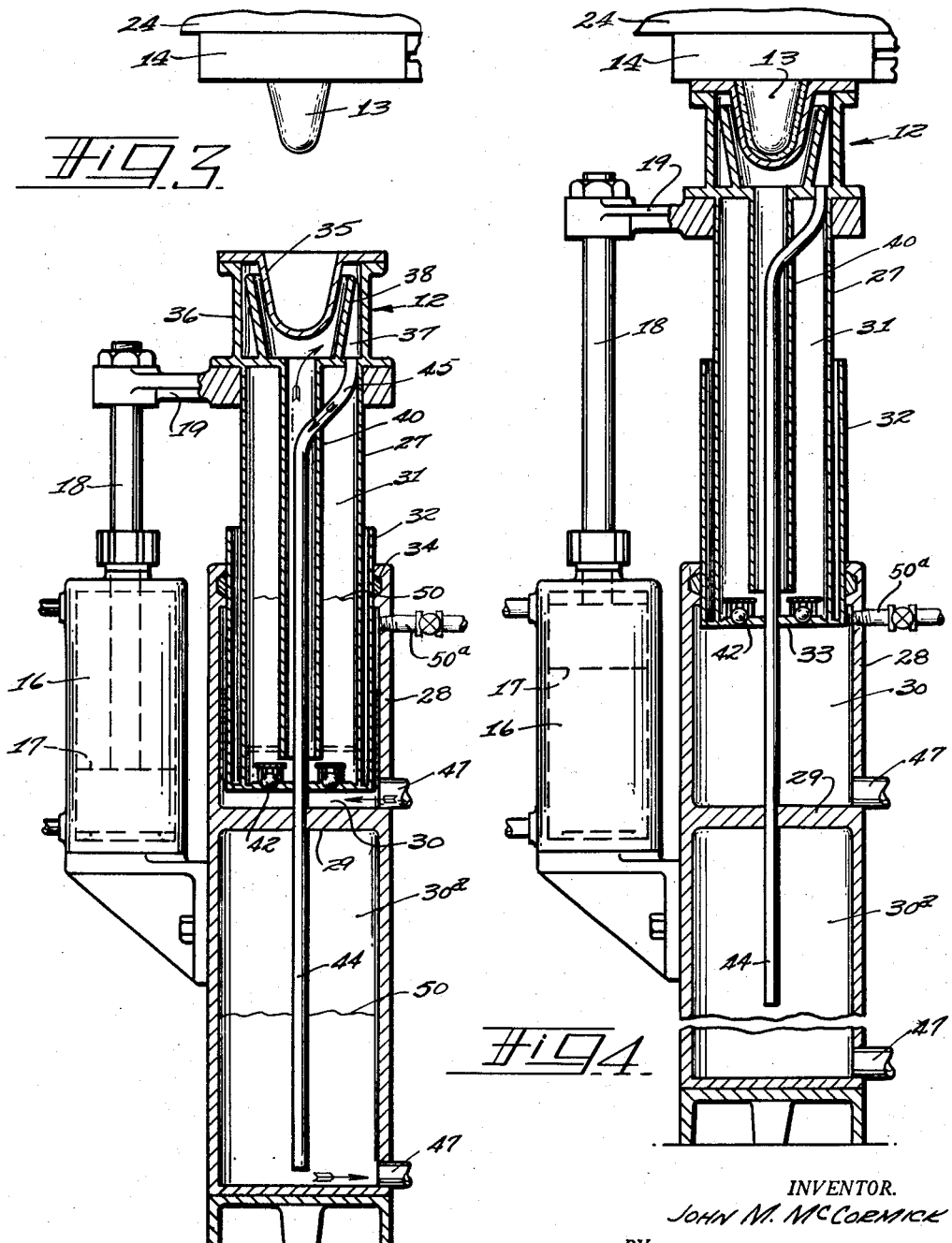

United States Patent Office 2,901,865
Patented Sept. 1, 1959

2,901,865

MEANS FOR COOLING GLASS FORMING MOLDS

John M. McCormick, Toledo, Ohio, assignor to Owens-Illinois Glass Company, a corporation of Ohio Application August 10, 1955, Serial No. 527,534

8 Claims. (Cl. 49—40)

My invention relates to apparatus for use in molding articles consisting of glass or other materials which are molded while at a high temperature and in a molten or plastic condition and which are solidified or hardened by reduction of temperature. The invention is herein illustrated and described as employed in molding glass articles but is not limited to use with glass, as various other thermoplastic materials may be molded by methods and means herein disclosed.

In the manufacture of glass articles by usual methods the molten or heat softened glass is introduced into metal molds which form the article into the desired shape. Heat is rapidly extracted from the glass by contact with the comparatively cool mold walls thereby solidifying the glass. Limitations on this process of extracting heat determine the speed and capability of the glass forming machine.

The rate of removal of heat depends largely on two factors, namely, the thermal properties of the metal parts and the steepness of the temperature gradients which can be maintained. Ordinarily the glass forming molds function periodically, being in contact with the hot glass for a few seconds and then cooling for a few seconds. The heat flow in the metal never reaches a steady state. The wall surface of the mold which is brought into contact with the molten glass is subjected to wide temperature variations. The hot glass raises the metal to a high temperature which is lowered when the glass is removed. The maximum and minimum temperatures of the mold walls in contact with the glass must be maintained within certain limits. Too high a temperature of the metal causes the glass to stick thereto, while too low a temperature results in surface checking or cracking of the glass and imperfect molding. Ordinarily cooling air is applied to the exterior surfaces of the molds to prevent overheating.

Attempts have been made to meet these temperature requirements by the use of water for intermittently cooling the molds, the water being used in the form of a timed jet or a pool of water which flashes steam. Such attempts have not been wholly successful. The boiling is difficult to control and residues are deposited from the water.

An object of the present invention is to provide a means for molding glass in which a bath of water may be used as a cooling means, with a design of the metal parts such that boiling does not occur, thereby retaining control of the distribution of the cooling and avoiding the deposit of evaporation residues. By increasing the wall thickness of the molds the steepness of the temperature gradient between the inner surface in contact with the hot glass and the outer surface in contact with the coolant, is reduced to such extent that boiling is prevented. Cooling in thus accomplished by a less expensive and quieter means of water flow rather than by the usual compressed air blast.

A further object of the invention is to provide a means employing a liquid coolant having a much higher boiling point than water, for example, molten alloy or salt. This makes it possible to use molds with thinner mold walls than with the use of either air or water as a coolant. This has the advantage of a more localized control of the heat removal from the glass and also the advantage of an improved temperature distribution. The circulation of the liquid coolant may be adequate to maintain its entire mass at an essentially constant temperature. For the same heat flow the swing of the temperature at the glass-metal face is reduced. For the same temperature limitations the flow may be increased so that the molding process is speeded up. These advantages become greater the nearer the constant temperature bath approaches the glass-metal interface thus permitting use of thin mold walls. The only limit in the reduction of the mold wall thickness is that it must be thick enough to withstand the mechanical forces exerted on it. Circulation of the coolant liquid is necessary. An object of the present invention is to provide novel and practical means for effecting such circulation. The eventual removal of heat from the liquid may be effected by the use of an external heat exchange or by design of the liquid container itself so that its outer wall will pass the heat.

Although the above novel features of the invention have been specified particularly with reference to molds for forming glass, similar considerations apply generally to all molding processes involving intermediate flow of heat. Thus, in molds for forming thermoplastic materials such, for example, as polyethylene, it is essential that the temperature of the working surface of the mold shall not exceed an upper limit value to avoid sticking. It is also desirable that the temperature of the mold surface remain above the dew point at all times to avoid condensation of moisture. Thus in molding thermoplastic materials it is desirable to employ thin walled molds with a liquid coolant having a higher boiling point than water.

Further objects and advantages of the invention will appear more fully hereinafter.

Referring to the accompanying drawings:

Fig. 3 is a sectional elevation showing a blank mold, its operating motor, and the circulating system for a liquid coolant; and Fig. 4 is a view similar to Fig. 3 but with the mold projected upwardly to the press molding position.

Figures 1, 2:
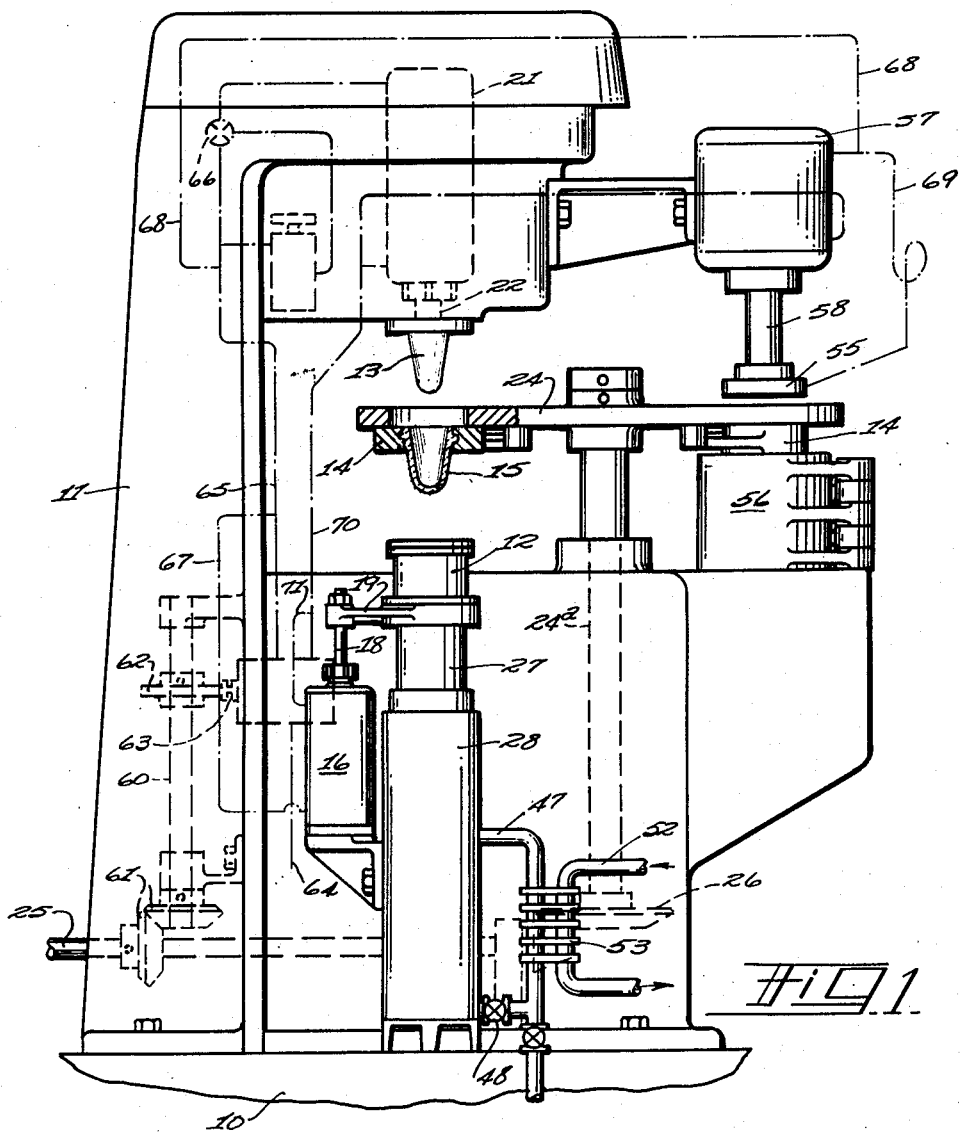
Fig. 1 is a part sectional elevational view of a machine for molding hollow glass articles in accordance with the present invention.
Fig. 2 is a detailed view of a check valve.

Referring particularly to Fig. 1, the glass molding machine comprises a machine base 10 and a standard 11 bolted thereto. A blank mold 12 is mounted for vertical reciprocating movement to and from a molding position in which it cooperates with a press plunger 13 and a neck mold 14 for molding parisons 15. The blank mold 12 is lifted and lowered by an air operated motor 16 comprising a vertical cylinder, a piston 17 (Fig. 3), and piston rod 18. The mold 12 is supported on and fixed to an arm 19 attached to the piston rod. An air operated piston motor 21, mounted in the standard 11, comprises a piston rod 22 to which the plunger 13 is attached.

A neck mold carrier 24 is keyed on the upper end of a vertical shaft 24ᵃ by which the carrier is intermittently rotated for bringing the neck molds 14 alternately into register with the plunger 13, the latter being in vertical line with the mold 12. A drive shaft 25 which may be continuously rotated, has driving connection through a train of gearing 26 to the shaft 24ᵃ for rotating the neck mold carrier 24. The train of gearing may include mutilated gears by which an intermittent rotation is imparted to the neck mold carrier.

The blank mold 12 is integral with or attached to a vertical cylindrical shell 27 extending downwardly therefrom and telescopically connected with a stationary cylinder 28 mounted on the machine base. A partition wall 29 divides the cylinder 28 into upper and lower compartments or chambers 30 and 30ª. These chambers and an upper chamber 31 formed by the cylinder 27 comprise parts of a circulating system for a liquid coolant. A cylindrical shell 32 surrounds the cylinder 27 and is spaced therefrom to provide for the circulation of cooling air. The shell or sleeve 32 is integrally connected at its lower end to the bottom wall 33 of the cylinder 27. A packing gland 34 is provided between the sleeve 32 and the cylinder 28.

The blank mold 12 comprises an inner wall 35 for molding the charges of glass, and an outer cylindrical wall 36 spaced from the inner wall to provide a chamber 37 in which the coolant is circulated as hereinafter described. A baffle 38 extends upwardly from the floor of the mold 12 within the chamber 37 and surrounds the mold wall 35. The baffle wall is upwardly flared and spaced from the inner and outer walls of the mold. A tube 40 within and concentric with the cylinder 27 is connected at its upper end to the floor of the mold 12 and opens into the chamber 37. The lower end of the tube 40 opens into the chamber 31, being spaced a short distance above the floor 33.

Check valves 42 are provided in the floor of the cylinder 27, each valve being mounted in a cage 43 (Fig. 2). A pipe 44, concentric with the telescoping cylinders, extends downwardly through the tube 40 and chamber 30 into the chamber 30ª. The upper end portion 45 of the pipe 44 is extended laterally through an opening in the wall of the tube 40 and opens into the chamber 37 in the mold.

A vertical exterior pipe 47 opens at its upper end into the chamber 30 just above the partition 29. The lower end of the pipe opens into the lower chamber 30ª near the floor of the chamber. This pipe permits upward flow of the liquid coolant 50 from the chamber 30ª into the chamber 30. A check valve 48 (Fig. 1) prevents flow in the reverse direction.

The above described construction provides a closed circulating system through which the liquid 50 is circulated repeatedly without need of replenishment. The coolant liquid is preferably one which remains in liquid form through a wide temperature range upwardly from a low solidifying temperature to the highest temperatures to which it is subjected while in contact with the mold. A suitable coolant which is preferred for use with the illustrated machine is a eutectic consisting of 78% sodium and 22% potassium. This mixture or alloy has a melting point below ordinary room temperature. As it cannot be used in the presence of air, owing to rapid oxidation, an inert gas, preferably nitrogen, is used in the circulating system. The nitrogen may be introduced through a pipe 50ª (Fig. 3) opening into the chamber 30.

Other materials including various salts, metals or metal alloys which remain liquid at the required working temperatures could be used for the coolant as, for example, lead or a lead-tin alloy, but as these are solids at room temperatures it is necessary for practical operation to provide some means for heating and melting the material each time the machine is started after having been stopped and cooled down. When water is used it is necessary to design the mold with comparatively thick walls in order to maintain a sufficiently low temperature of the water.

The operation of the circulating system is as follows: Assuming that the sodium-potassium eutectic is used as the heat transfer medium and that nitrogen is used as the gas in the circulating system, and also assuming that the blank mold 12 is in its lowered position (Fig. 3); then, when the motor 16 moves the blank mold upwardly, liquid 50 flows from the lower chamber 30ª upwardly through the pipe 47 into the chamber 30 to fill the void produced by the upward movement of the cylinder 27. This lowers the level of the liquid in the chamber 30ª thereby reducing the pressure. The unbalanced pressure within the chamber 31 initiates a circulation of the liquid through the chamber 37 in the mold. That is, the pressure within the chamber 31 causes an upward flow of the liquid through the tube 40 into chamber 37, and thence downward through the pipe 45, 44 into the lower chamber 30ª. This flow continues until the pressure within the upper and lower chambers is balanced. The surge of the liquid also tends to prolong the flow. The annular space between the inner wall 35 of the blank mold and the baffle 38 is narrow enough to insure a rather rapid flow of the liquid coolant along the mold wall so that the temperature of the coolant is not raised sufficiently to interfere with or prevent a rapid heat transfer at the glass-metal interface and through the mold wall.

When the mold 12 is lowered, after the parison 15 has been molded therein, there is a further circulation of the liquid through the mold chamber 37, produced as follows: The downward movement of the cylinder 27 causes the liquid in the chamber 30 to flow upwardly through the check valves 42 into the upper chamber 31. Downward flow of the liquid from the chamber 30 through the pipe 47 is prevented by the check valve 48 (Fig. 1). As the liquid flows into the chamber 27 the pressure of the gas above the liquid causes an upward flow through the tube 40 into the chamber 37 and thence downwardly through the pipe 44 into the lower chamber 30ª. This flow is maintained until the pressures are balanced, thus completing a cycle.

Heat may be extracted from the coolant liquid during its passage through the pipe 47 by a heat extractor associated therewith. Water or other cooling liquid is circulated through a pipe 52. The heat extractor 53 comprises metal plates or conductors extending between the pipes 47 and 52.

After a parison has been pressed within the blank and neck molds, the blank mold and plunger 13 are withdrawn and the neck mold carrier 24 indexed to bring the parison therein into an open finishing mold 56 below and in register with a blow head 55. The finishing mold is then closed around the parison and the blow head lowered by a piston motor 57, the blow head being carried by the motor piston rod 58. The parison is now blown to its finished form within the combined neck and finishing molds.

The control system for the air-operated piston motors comprises a timer shaft 60 driven continuously by the drive shaft 25 operating through gears 61. A timer cam 62 on the shaft 60 operates a slide valve 63. An air pressure line 64 is opened by the movement of the slide valve in one direction, to a pressure line 65 extending through a check valve 66 to the upper end of the cylinder 21, thereby supplying pressure for lowering the plunger 13. A branch line 67 at the same time supplies pressure to the lower end of the cylinder 16, thereby causing it to lift the blank mold 12. Another branch line 68 supplies air pressure to the upper end of the motor 57 for lowering the blow head and causing the latter to blow a blank within the finishing mold. The blowing air is supplied through a line 69.

When the cam 62 reverses the slide valve 63, the line 65 is cut off and a pressure line 70 is opened. This supplies air pressure to the lower end of the motors 21 and 57 thereby causing said motors to withdraw the plunger 13 and the blowing head 55 upwardly. A branch line 71 extending to the upper end of the motor 16 supplies pressure for lowering the blank mold.

A resume of the operation is as follows: Gobs or charges of molten glass are dropped periodically into the blank mold 12. The mold carrier 24 is rotated intermittently to bring the neck molds 14 alternately between the blank mold and the plunger 13. With a neck mold in this position the cam 62 operates the slide valve, thus supplying air pressure to the motors 16 and 21 which operate respectively to lift the mold 12 and lower the plunger 13 so that the charge of molten glass is press molded within the blank mold 12 and neck mold 14. A parison suspended from the other neck mold is enclosed within the finishing mold 56 and blown to finished form. The up-and-down movement of the blank mold causes a forced circulation of the coolant liquid 50 through the cooling chamber 37 of the blank mold thereby causing a rapid transfer of heat through the mold wall 35 to the coolant liquid circulating in contact with the mold wall. The coolant is maintained at the desired temperature by extracting heat therefrom through the heat exchanger 53.

Modifications may be resorted to within the spirit and scope of my invention.

I claim:

1. Molding apparatus comprising a mold having a mold wall shaped to form a mold cavity and a cooling chamber surrounding the mold wall a liquid coolant, means cooperating with the mold for providing a circulating system for the liquid coolant, including telescopically connected hollow cylinders containing the liquid coolant, said system including means providing a passageway between said cylinders through which the liquid is caused to flow from one cylinder to the other by relative telescopic movement of the cylinders, and means providing a separate passageway for the return of the liquid, said separate passageway including said cooling chamber, and means for moving the mold to and from a molding position, one of said cylinders being connected to the mold for movement therewith and operative thereby to cause the circulation of the coolant liquid.

2. A machine for molding hollow glass articles comprising a blank mold formed with an upwardly opening mold cavity, said mold comprising a cooling chamber surrounding the walls of the mold cavity, a plunger mounted above the mold, the mold being mounted for up-and-down movement to and from a molding position in which the plunger is projected into the mold cavity, a motor connected to the mold and operative to move the mold to and from said molding position, a coolant liquid, and means combined with said mold to provide a circulating system comprising a closed passageway including said cooling chamber through which the coolant liquid is repeatedly circulated under pressure in contact with the exterior wall surface of the blank mold cavity walls, said system comprising a stationary hollow cylinder open at its upper end, a movable cylinder connected to the mold and extending downwardly into the stationary cylinder and telescopically connected therewith, the said liquid being contained within said cylinders, said passageway including an opening between said cylinders through which the liquid flows from the stationary cylinder to the movable cylinder during the downward movement of the movable cylinder, a check valve in said opening, the system including a separate passageway for the return flow of the liquid to the stationary cylinder, and through which separate passageway the flow of the liquid is directed into contact with the exterior surface of the mold wall during the movement of the mold to and from its molding position.

3. The combination of a mold having an inner mold wall shaped to form a mold cavity and an outer mold wall surrounding and spaced from the inner wall to provide a cooling chamber, hollow telescopically connected cylinders comprising an upper cylinder attached to and movable up and down with the mold and providing an upper movable chamber for a circulating liquid, and a lower stationary vertical cylinder with an intermediate partition dividing it into lower and upper stationary chambers, a cooling liquid within said cylinders, a motor connected to the mold and movable cylinder for moving the mold and cylinder up and down to and from a molding position, and means forming communicating passages between said chambers for causing a circulation of the liquid within and through the said chambers during the movement of the mold.

4. The apparatus defined in claim 3, the movable cylinder having a closed bottom with an upwardly opening check valve therein permitting an upward flow of the liquid from the upper stationary chamber into the movable chamber, a tube extending downwardly within the movable cylinder and opening into the movable chamber adjacent the lower end thereof, said tube opening into the cooling chamber of the mold, a pipe opening into said mold chamber and extending downwardly therefrom into the lower chamber of the stationary cylinder, and means providing a channel for the flow of liquid from the lower stationary chamber to the lower movable chamber.

5. The apparatus defined in claim 4, the said channel comprising a pipe positioned exteriorly of the cylinders and a heat extractor cooperating with said exterior pipe for extracting heat from the cooling liquid.

6. The combination set forth in claim 3, the cooling liquid comprising an alloy of sodium and potassium.

7. A machine for molding hollow glass articles comprising a blank mold formed with an upwardly opening mold cavity, said mold comprising a cooling chamber surrounding the walls of the mold cavity, a plunger mounted above the mold, the mold being mounted for up-and-down movement to and from a molding position in which the plunger is projected into the mold cavity, a motor connected to the mold and operative to move the mold to and from said molding position, a coolant liquid, and means combined with said mold to provide a circulating system comprising a closed passageway including said cooling chamber through which the coolant liquid is repeatedly circulated under pressure in contact with the exterior wall surface of the blank mold cavity walls, said system comprising a stationary hollow cylinder open at its upper end and a movable cylinder connected to the mold and extending downwardly into the stationary cylinder and telescopically connected therewith, the said coolant liquid being contained within said cylinders, the stationary cylinder having a partition dividing it into upper and lower chambers, said movable cylinder having a bottom with a check valve therein permitting upward flow of the liquid into the said movable cylinder chamber, means providing a channel for the flow of liquid from the lower to the upper chamber of said stationary cylinder, and means providing a channel for the flow of liquid from the chamber in the movable cylinder upwardly to the mold wall and thence downwardly to the lower chamber in the stationary cylinder.

8. The combination of apparatus as claimed in claim 3 and check valve means in at least one of said passages adapted to be opened by flow of the cooling liquid in one direction and closed by flow of cooling liquid in the opposite direction.

References Cited in the file of this patent

UNITED STATES PATENTS

| | | |
|---|---|---|
| 1,057,198 | Winder | Mar. 25, 1913 |
| 1,531,415 | Said | Mar. 31, 1925 |
| 1,578,448 | Lebby | Mar. 30, 1926 |
| 1,798,136 | Barker | Mar. 31, 1931 |
| 1,922,509 | Thurm | Aug. 15, 1933 |
| 1,949,899 | Collins et al. | Mar. 6, 1934 |
| 2,402,708 | Stewart et al. | June 25, 1946 |
| 2,419,763 | Cassell | Apr. 29, 1947 |
| 2,604,053 | Lower | July 22, 1952 |
| 2,751,715 | Denman | June 26, 1956 |